US007473175B2

(12) United States Patent
Baerlocher

(10) Patent No.: US 7,473,175 B2
(45) Date of Patent: *Jan. 6, 2009

(54) GAMING DEVICE HAVING A CONTROLLED EXPECTED PAYOUT PROVIDING AN OPPORTUNITY FOR PLAYER SKILL TO AFFECT SYMBOL MOVEMENT

(75) Inventor: Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 27 days.

This patent is subject to a terminal disclaimer.

(21) Appl. No.: 11/106,992

(22) Filed: Apr. 15, 2005

(65) Prior Publication Data

US 2005/0181853 A1 Aug. 18, 2005

Related U.S. Application Data

(63) Continuation of application No. 10/408,606, filed on Apr. 7, 2003, now Pat. No. 6,918,830, which is a continuation of application No. 09/684,535, filed on Oct. 6, 2000, now Pat. No. 6,572,473.

(51) Int. Cl.
*A63F 13/00* (2006.01)
*A63F 13/10* (2006.01)

(52) U.S. Cl. .......................................... 463/20; 463/16

(58) Field of Classification Search ..................... 463/7, 463/16–20, 36–37; 273/138.1, 139, 141 R, 273/141 A, 142 R, 143 R, 142 A–142 D, 273/142 H, 142 HA, 142 J See application file for complete search history.

(56) References Cited

U.S. PATENT DOCUMENTS 4,448,419 A 5/1984 Telnaes
4,582,324 A 4/1986 Koza et al.
4,618,150 A 10/1986 Kimura (Continued)

FOREIGN PATENT DOCUMENTS

EP 375190 A * 6/1990

(Continued)

OTHER PUBLICATIONS

Packel, Edward, Mathematics of Games and Gambling, The Mathematical Association of America, 1981, pp. 24.*

(Continued)

*Primary Examiner*—Robert E Pezzuto
*Assistant Examiner*—Frank M Leiva
(74) *Attorney, Agent, or Firm*—Bell, Boyd & Lloyd LLP

(57) ABSTRACT

A gaming device with a bonus scheme which includes a plurality of parent regions and sub-regions. The gaming device moves at least one symbol with respect to the sub-regions and enables the player to use his/her skill to stop the symbol and indicate a sub-region within a parent region. Which sub-region the symbol will indicate within such parent region is determined by the gaming device, preferably unbeknownst to the player. The gaming device preferably awards the player with value associated with the sub-region which is indicated by the stopped symbol. This type of game provides players with skill-based activities thereby adding excitement to gaming devices and increasing player entertainment.

37 Claims, 6 Drawing Sheets

U.S. PATENT DOCUMENTS

| | | | | |
|---|---|---|---|---|
| 4,695,053 | A | 9/1987 | Vasquez, Jr. et al. | |
| 4,743,024 | A | 5/1988 | Helm et al. | |
| 4,773,647 | A | 9/1988 | Okada et al. | |
| 5,342,047 | A | 8/1994 | Heidel et al. | |
| 5,342,049 | A | 8/1994 | Wichinsky et al. | |
| 5,393,061 | A | 2/1995 | Manship et al. | |
| 5,511,781 | A * | 4/1996 | Wood et al. | 463/13 |
| 5,524,888 | A | 6/1996 | Heidel | |
| 5,766,074 | A | 6/1998 | Cannon et al. | |
| 5,772,509 | A | 6/1998 | Weiss | |
| 5,788,573 | A | 8/1998 | Baerlocher et al. | |
| 5,823,874 | A | 10/1998 | Adams | |
| 5,848,932 | A | 12/1998 | Adams | |
| 5,882,261 | A | 3/1999 | Adams | |
| 5,910,046 | A | 6/1999 | Wada et al. | |
| 5,911,418 | A | 6/1999 | Adams | |
| 5,941,770 | A | 8/1999 | Miers et al. | |
| 6,015,346 | A | 1/2000 | Bennett | |
| 6,019,369 | A | 2/2000 | Nakagawa et al. | |
| 6,033,307 | A * | 3/2000 | Vancura | 463/20 |
| 6,050,895 | A | 4/2000 | Luciano, Jr. et al. | |
| 6,056,642 | A | 5/2000 | Bennett | |
| 6,071,192 | A | 6/2000 | Weiss | |
| 6,089,976 | A | 7/2000 | Schneider et al. | |
| 6,089,977 | A | 7/2000 | Bennett | |
| 6,089,978 | A | 7/2000 | Adams | |
| 6,102,798 | A | 8/2000 | Bennett | |
| 6,110,039 | A | 8/2000 | Oh | |
| 6,110,041 | A | 8/2000 | Walker et al. | |
| 6,117,007 | A | 9/2000 | Matsuyama et al. | |
| 6,117,008 | A | 9/2000 | Machiguchi | |
| 6,126,165 | A | 10/2000 | Sakamoto | |
| 6,135,884 | A | 10/2000 | Hedrick et al. | |
| 6,142,873 | A | 11/2000 | Weiss et al. | |
| 6,142,874 | A | 11/2000 | Kodachi et al. | |
| 6,159,095 | A | 12/2000 | Frohm et al. | |
| 6,159,097 | A | 12/2000 | Gura | |
| 6,165,070 | A | 12/2000 | Nolte et al. | |
| 6,168,520 | B1 * | 1/2001 | Baerlocher et al. | 463/16 |
| 6,174,233 | B1 | 1/2001 | Sunaga et al. | |
| 6,174,234 | B1 * | 1/2001 | Seibert et al. | 463/20 |
| 6,174,235 | B1 | 1/2001 | Walker et al. | |
| 6,186,894 | B1 * | 2/2001 | Mayeroff | 463/20 |
| 6,190,255 | B1 | 2/2001 | Thomas et al. | |
| 6,231,442 | B1 | 5/2001 | Mayeroff | |
| 6,231,445 | B1 | 5/2001 | Acres | |
| 6,251,013 | B1 | 6/2001 | Bennett | |
| 6,261,177 | B1 | 7/2001 | Bennett | |
| 6,270,411 | B1 | 8/2001 | Gura et al. | |
| 6,270,412 | B1 * | 8/2001 | Crawford et al. | 463/20 |
| 6,287,194 | B1 | 9/2001 | Okada et al. | |
| 6,302,790 | B1 | 10/2001 | Brossard | |
| 6,315,660 | B1 | 11/2001 | Demar et al. | |
| 6,394,902 | B1 * | 5/2002 | Glavich et al. | 463/20 |
| 6,488,580 | B1 | 12/2002 | Robb | |
| 6,537,150 | B1 | 3/2003 | Luciano et al. | |
| 6,761,632 | B2 | 7/2004 | Bansemer et al. | |
| 6,767,284 | B1 * | 7/2004 | Koza | 463/29 |
| 6,780,103 | B2 | 8/2004 | Bansemer et al. | |
| 6,783,458 | B2 | 8/2004 | Mead et al. | |
| 2002/0065126 | A1 * | 5/2002 | Miller et al. | 463/20 |
| 2002/0193158 | A1 * | 12/2002 | Weiss et al. | 463/16 |
| 2003/0064796 | A1 * | 4/2003 | Glavich et al. | 463/25 |

FOREIGN PATENT DOCUMENTS

| | | | |
|---|---|---|---|
| EP | 375190 | A2 | 6/1990 |
| EP | 0688002 | A1 | 12/1995 |
| WO | WO 00/12186 | | 3/2000 |

OTHER PUBLICATIONS

Jackpot Party Brochure and Article published by WMS Gaming Inc. in 1998.

Elvis Brochure and Elvis Article by IGT, Published 1999.

Press Your Luck Article by Strictly Slots, dated 2000.

Introducing The Hottest Video Games on the Nile written by Aristocrat Technologies, published Oct. 2000.

Slotto Article by Strictly Slots, dated 2001.

Cash Chameleon Article written by Aristocrat Technologies, published Apr. 2001.

Reel em In—Cast for Cash Brochure & Website published by WMS Gaming, Inc. in 2001.

Winning Bid Brochure published by WMS Gaming, Inc. 2001.

Tickets'n'Tunes from www.rgb.com printed on Feb. 28, 2002.

Primetime Amusements Redemption Games from www.primetimeamusements.com printed on Feb. 28, 2002.

Weiner Distributing ICE Cyclone™f from www.winerd.com. printed on Feb. 28, 2002.

Mountain Coin Machine Distributing—Redemption Games—Cyclone™ from www.mountaincoin.com printed Feb. 28, 2002.

* cited by examiner

| PARENT REGIONS | SUB-REGION 1 P | SUB-REGION 1 V | SUB-REGION 2 P | SUB-REGION 2 V | SUB-REGION 3 P | SUB-REGION 3 V | EXPECTED VALUE |
|---|---|---|---|---|---|---|---|
| A | 10% | 100 | 30% | 40 | 60% | 20 | 34.00 |
| B | 10% | 90 | 30% | 60 | 60% | 12 | 34.20 |
| C | 5% | 400 | 20% | 30 | 75% | 11 | 34.25 |
| D | 2% | 1,500 | 40% | 7 | 58% | 2 | 33.96 |

GAMING DEVICE HAVING A CONTROLLED EXPECTED PAYOUT PROVIDING AN OPPORTUNITY FOR PLAYER SKILL TO AFFECT SYMBOL MOVEMENT

PRIORITY CLAIM

This application is a continuation of, and claims priority to and the benefit of, U.S. patent application Ser. No. 10/408,606, filed Apr. 7, 2003, now U.S. Pat. No. 6,918,830, which is a continuation of, and claims priority to and the benefit of, U.S. patent application Ser. No. 09/684,535, filed Oct. 6, 2000, now U.S. Pat. No. 6,572,473, the entire contents of which are incorporated herein.

CROSS REFERENCES TO RELATED APPLICATIONS

This application is related to the following commonly-owned co-pending patent applications: "GAMING DEVICE HAVING A MULTIPLE ROUND GAME THAT INCLUDES PLAYER CHOICES AND PROCESSOR CHOICES," Ser. No. 09/966,855, "GAMING DEVICE HAVING PERCEIVED SKILL," Ser. No. 10/832,729, "GAMING DEVICE HAVING SKILL/PERCEIVED SKILL GAME," Ser. No. 10/919,971, and "METHOD AND GAMING DEVICE OPERATING A MULTIPLE ROUND GAME THAT INCLUDES DIMINISHING SELECTION SETS," Ser. No. 10/923,570.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device which has a game scheme which involves symbol movement and allows a player's skill to influence such movement without influencing a player's award.

BACKGROUND OF THE INVENTION

Traditional gaming machines, such as slot machines, include a plurality of reels and each reel has upon it a plurality of symbols. When the player pushes a button the reels rotate and where they stop, relative to one another, determines whether or not the player gains value. Other gaming devices include spinning wheels which are divided into a plurality of pie-shaped areas. The wheel rotates with respect to a pointer. Depending upon which area stops at the pointer, the player may or may not gain value. Still other gaming devices involve bonus rounds which are often video-based. The bonus schemes vary from gaming device to gaming device and generally involve a variety of game scenarios.

In gaming devices, unlike arcade games, a player's success is not based upon skill. Gaming devices are programmed or set to randomly pay back a certain percentage. Having a gaming device truly based on skill would open the door to players becoming professionals at such games. Gaming devices of skill would also prejudice unskilled players, and unskilled players would be reluctant to play such games. Even though certain gaming devices such as video poker or blackjack involve certain skill and decision-making, their outcomes ultimately turn upon mathematics and probability. Accordingly, to increase player enjoyment and excitement, it is desirable to provide players with new gaming devices and game schemes wherein the player's success appears to be determined by the player's skill.

SUMMARY OF THE INVENTION

The present invention overcomes the above shortcomings by providing a gaming device having a game scheme which includes a plurality of parent regions and sub-regions. The term parent region, as used herein, includes any area or space which includes within it two or more sub-regions. Likewise, a sub-region is an area or space located within a parent region. The parent regions are preferably adjoined, however, they can be separated. The gaming device moves a symbol and uses the symbol to indicate a particular sub-region. Preferably, the gaming device moves the symbol along the sub-regions. Preferably, the gaming device does not display the parent regions to the player, but rather only displays the sub-regions to the player.

In addition, an award is associated with one or more of the sub-regions. The term award, as used herein, means a value or an opportunity to gain value. Such opportunities can involve bonus rounds or additional plays. Furthermore, the gaming device informs the player of the sub-regions which are associated with these awards. Preferably, the awards vary from sub-region to sub-region. It is expected that the player will seek to stop the symbol at the sub-region associated with the highest award.

In operation, the player activates an input device while the symbol is moving and indicating one or more sub-regions within a particular parent region. The gaming devices enables the symbol to continue moving so as to indicate a sub-region within the upcoming parent region where the gaming device stops the symbol from moving. The gaming device uses a predetermined mathematical calculation to determine where the symbol stops and which sub-region is indicated.

This calculation involves associating a stop probability with each sub-region within a parent region. The stop probability is the probability that the symbol will stop and indicate a particular sub-region. The sum of the stop probabilities for all of the sub-regions in a particular parent region is one hundred percent. For example, a parent region may include three sub-regions (sub-region one, sub-region two and sub-region three). Sub-region one may be associated with a relatively low award, sub-region two may be associated with a moderate award and sub-region three may be associated with a relatively high award. The gaming device may associate a seventy percent stop probability with sub-region one, a twenty-five percent stop probability with sub-region two and a five percent stop probability with sub-region three. As such, there is a relatively high probability that the player will reach a relatively low award and a relatively low probability that the player will reach a relatively high award.

Preferably, the awards include values but could also include advancement to a bonus round. These values are associated with each sub-region within a parent region and are preferably displayed to the player. It is also preferable that each such parent region has the same or substantially the same expected value. The expected value is the sum of the product of the stop probabilities and values associated with each sub-region. It is expected that the player will pursue the highest value by attempting to stop the symbol and indicate the sub-region associated with the highest value. When the player attempts to do so, the player can use his or her skill to stop the moving symbol and indicate a sub-region within a particular parent region. However, the player cannot use his or her skill to determine which sub-region the symbol will indicate. Rather, as discussed above, which sub-region the symbol indicates is determined by a mathematical calculation used by the gaming device.

The game scheme of the present invention displays a plurality of sub-regions to players and informs players of various awards associated with these sub-regions. The gaming scheme also includes a symbol which moves with respect to the sub-regions, and where the symbol stops preferably determines which award is provided to the player. Furthermore, the gaming device enables the player to cause the symbol to stop moving. This type of game scheme is intriguing to players because it involves the skill of timing a moving symbol so that it stops at a desired location. Although the gaming device enables players to use their skills to cause the symbol to stop moving, it does not enable players to use their skills to stop the symbol and indicate a particular sub-region. Rather, the gaming device enables players to use their skills to stop the symbol and indicate a sub-region within a particular parent region, and which sub-region the symbol indicates is determined by a mathematical calculation made by the gaming device.

It is therefore an object of the present invention to provide a gaming device having a game scheme which allows a player's skill to affect symbol movement without affecting a player's award.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
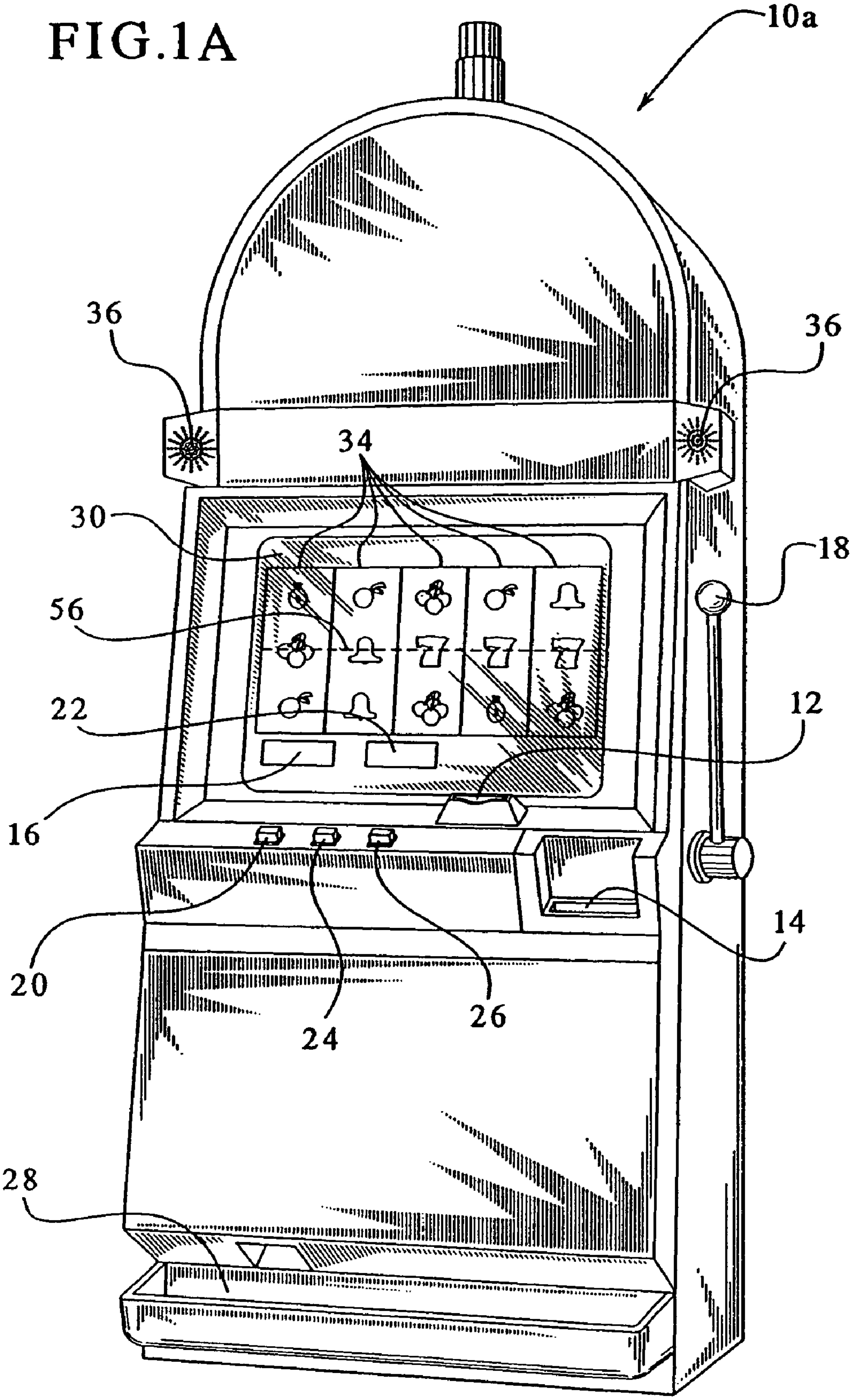
FIG. 1A is a perspective view of one embodiment of the gaming device of the present invention.
Figure 1B:
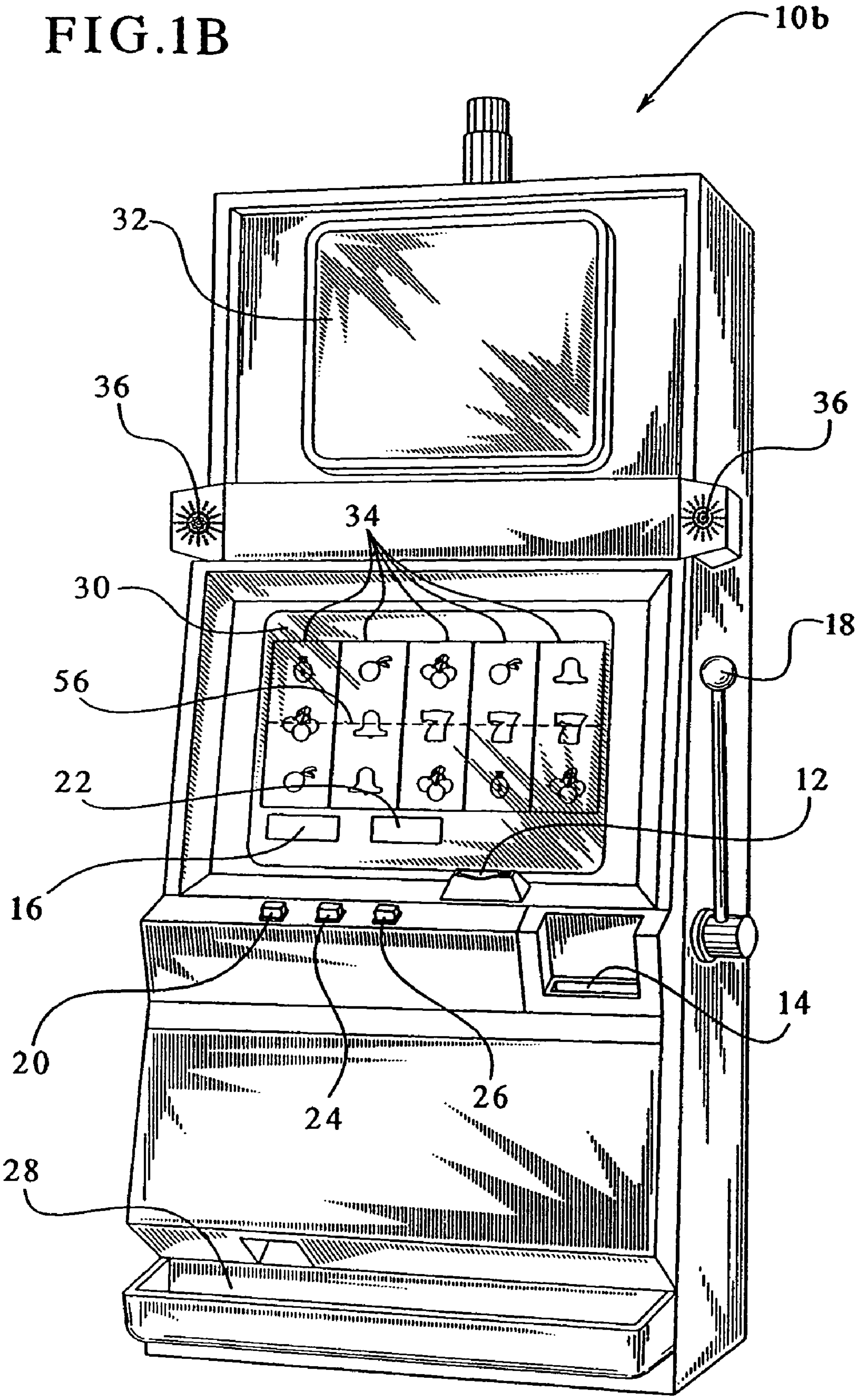
FIG. 1B is a perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is preferably a slot machine having the controls, displays and features of a conventional slot machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker or keno, any of their bonus triggering events and any of their bonus round games. The symbols and indicia used on and in gaming device 10 may be in mechanical, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

At any time during the game, a player may "cash out" and thereby receive a number of coins corresponding to the number of remaining credits by pushing a cash out button 26. When the player "cashes out," the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 preferably displays a plurality of reels 34, preferably three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
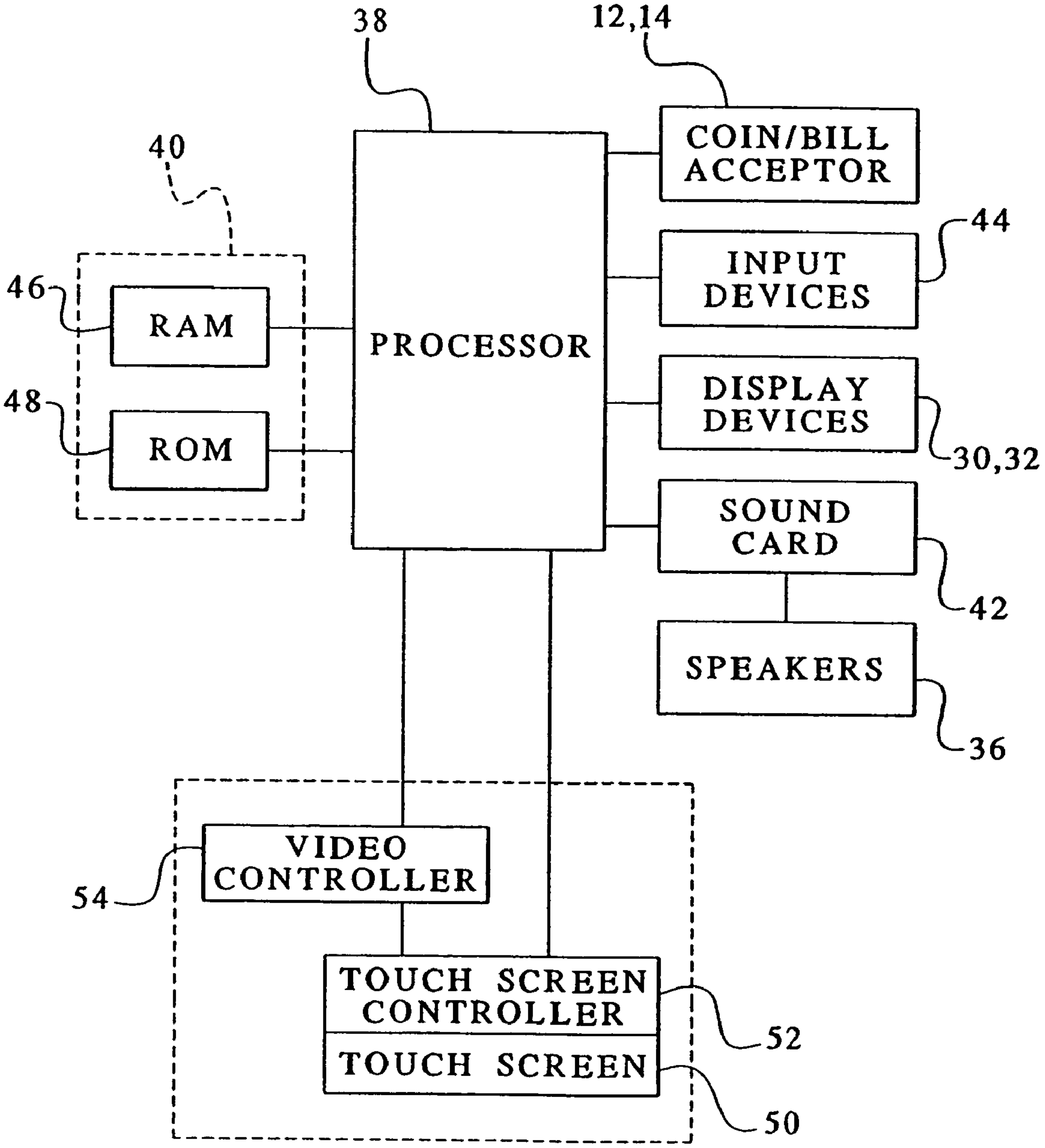
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the "computer" or "controller."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, preferably gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 preferably uses a video-based central display device 30 to enable the player to play the bonus round. Preferably, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Game Scheme

The present invention of the gaming device is a game scheme which can be included in a primary game of a gaming device and/or in a bonus round of a gaming device. In the primary game, the game scheme begins when the player deposits the appropriate amount of money in the gaming device and activates the necessary input devices to initiate the primary game. When the game scheme is included in a bonus round, the game scheme begins when the player achieves a bonus triggering or qualifying condition while playing the primary game of the gaming device.

The game scheme of the present invention includes a plurality of parent regions 100 and a plurality of sub-regions 102. The gaming device displays the sub-regions 102 to the player on one or more display devices. Preferably, the gaming device 10 does not display the parent regions 100 to the player, however, the gaming device 10 can be adapted to do so. The game scheme of the present invention also includes at least one symbol 104 which is displayed by the gaming device so as to indicate a particular sub-region 102. Preferably the symbol 104 indicates a sub-region 102 by being displayed adjacent to, on, or near a sub-region 102. The term symbol, as used herein, means: (i) any physical object; or (b) any visual or audio-visual representation of a person, place or thing, at rest or in motion. Symbol 104 is identified in FIGS. 3 and 4 as an encircled S.

Figures 3, 6:
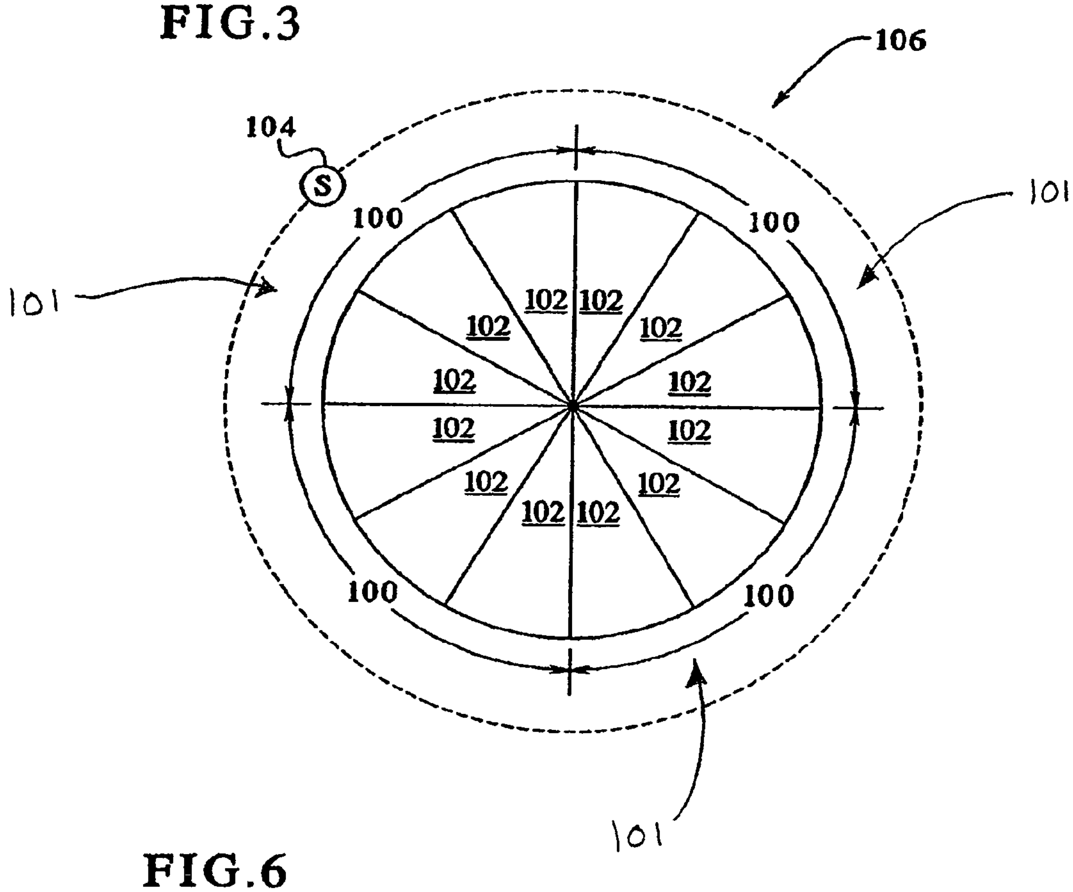
FIG. 3 is a top plan view of one embodiment of present invention.
FIG. 6 is a table of stop probabilities, values and expected values associated with various parent regions in one embodiment of the present invention.

It is preferable that the plurality of parent regions 100 are adjoined and consequently the sub-regions 102 together form a continuous course 101. As shown in FIG. 3, this course 101 may take the form of a wheel 106. This wheel 106 includes four parent regions 100 which adjoin one another and together constitute three hundred sixty degrees. Each parent region 100 includes within it three sub-regions 102. Also shown here is symbol 104, and the movement of symbol 104 is indicated by the circular dotted line shown in FIG. 3. Symbol 104 is shown at a particular location in FIG. 3. However, symbol 104 can be positioned anywhere along the dotted line or anywhere on or near wheel 106.

Figure 4:
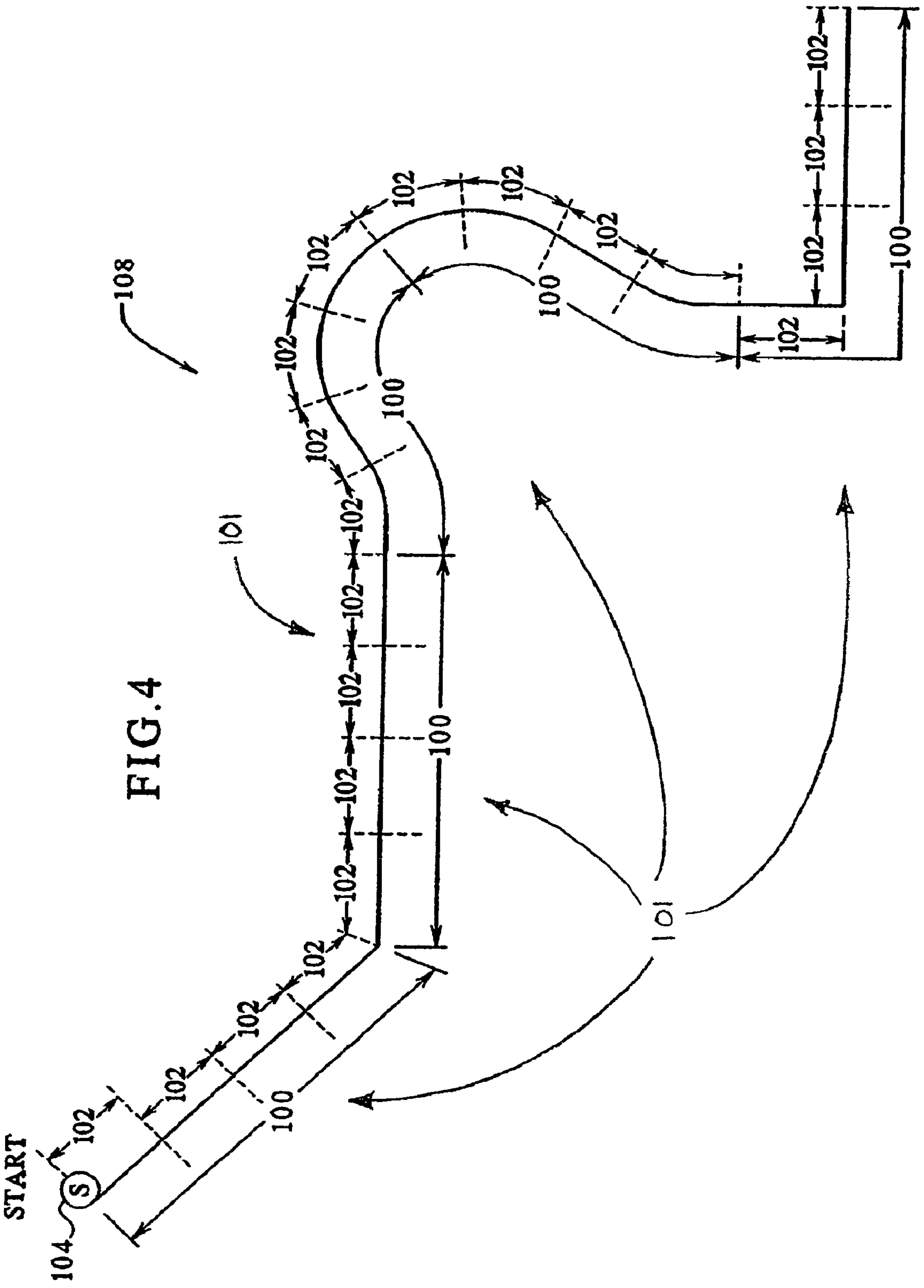
FIG. 4 is a top plan view of another embodiment of the present invention.

The continuous course 101 (which includes the parent regions 100 and sub-regions 102) can also take the form of a path 108, as shown in FIG. 4. Path 108 can include sub-regions 102 of any particular dimension, size or shape. Here, they are illustrated as line segments. Furthermore, path 108, as shown in FIG.4, takes on a variety of different shapes, including a slope portion, a horizontal portion, a curved portion and a vertical portion. A path 108 can include one or more of these portions or other configurations. As shown in FIG. 4, symbol 104 begins at the upper left-hand corner of path 108. However, symbol 104 can begin at any location along the path 108.

The parent regions 100 and sub-regions 102 shown in FIGS. 3 and 4 are all adjoined as part of the continuous course 101. However, in alternative embodiments, one or more of the parent regions 100 and/or sub-regions 102 can be separated from one another. Furthermore, the separated regions can be displayed by the gaming device in any orderly arrangement or disorderly fashion. In addition, in these types of embodiments, symbol 104 may move and indicate various sub-regions 102 in a logical fashion according to the spatial position of the sub-regions 102 with no regard to such spatial position or in any random fashion or any other fashion.

When symbol 104 is described herein as moving or in motion, this means that the gaming device is performing one of the following movement exhibitions: (a) physically moving symbol 104; (b) moving symbol 104 in video form or virtual form; (c) carrying out a dynamic lighting scheme so as to create the illusion or impression that symbol 104 is moving; (d) not moving symbol 104 but instead moving at least one background of symbol 104; (e) spinning wheel 106 adjacent to a non-moving symbol 104; and (f) carrying out any functions which otherwise simulate movement of symbol 104.

Figure 5:
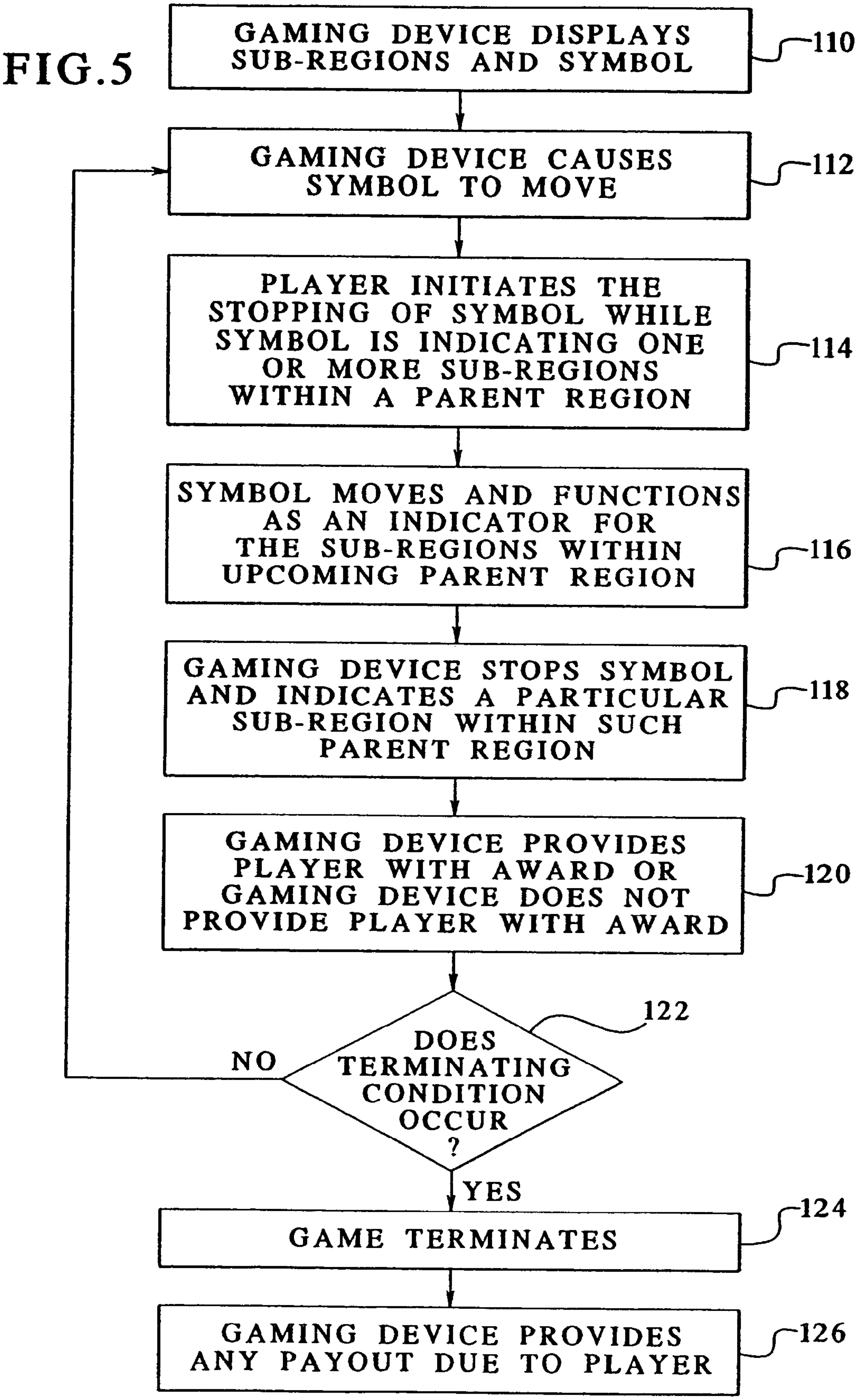
FIG. 5 is a flow diagram of one embodiment of the present invention.

With reference to FIG. 5, in operation the gaming device initially displays the sub-regions 102 and symbol 104 to the player as indicated by block 110. Simultaneously with such display or shortly after such display, the gaming device causes symbol 104 to move, as indicated by block 112. The gaming device can cause symbol 104 to move by automatically doing so according to a predetermined program of the gaming device's computer, or the gaming device can enable the player to activate an input device, such as play button 20, thereby causing symbol 104 to move.

In any case, once symbol 104 is moving the player can initiate the stopping of symbol 104 while the symbol is indicating one or more sub-regions 102 within a parent region 100, as indicated by block 114 in FIG. 5. The gaming device enables the player to judge the speed of symbol 104 and the size of sub-regions 102 and use this information along with the player's hand-eye coordination to skillfully initiate the stopping of symbol 104. Preferably, the parent regions 100 are not displayed to the player, and it appears to the player that the player has the ability to stop symbol 104 and indicate a desired sub-region 102.

As indicated by block 116 in FIG. 5, after the player initiates the stopping of symbol 104, the symbol 104 then continues to move until it functions as an indicator for the sub-regions 102 within the upcoming parent region 100. There the gaming device stops symbol 104 and indicates a particular sub-region 102 within such parent region 100 as indicated by block 118. Where symbol 104 stops and which sub-region 102 the symbol 104 indicates is determined according to a mathematical calculation performed by the computer of the gaming device. The gaming device can perform this calculation before or during the operation of the game.

The game scheme of the present invention also includes one or more awards associated with one or more of the sub-regions 102. The gaming device informs the player of the value of the awards in some fashion, preferably by visually displaying a numeric value, a bonus indicator or otherwise on the display device. The gaming device may accomplish this by displaying a table of awards which corresponds to the sub-regions 102, by using the size of the sub-regions 102 relative to one another, by using the color of the sub-regions 102 relative to one another or by using any other technique. However, preferably the gaming device informs the player of the award value by displaying a message on or near the sub-regions 102. These messages (not shown) can include numeric values, text or graphics.

With reference to FIG. 6, the mathematical calculation involves stop probabilities indicated with the notation "P," preferable numeric values indicated with the notation "V" and expected values. The example shown in FIG. 6 illustrates a calculation involving four parent regions 100 indicated as A, B, C and D. Each parent region 100 includes within it three sub-regions 102. Each sub-region 102 has its own stop probability which, as shown, may or may not vary from sub-region to sub-region. In addition, each sub-region 102 is associated with an award. In the example shown in FIG. 6, the award is a numeric value. The gaming device stops the symbol 104 and indicates a particular sub-region 102 by taking into account the stop probabilities. As illustrated in FIG. 6, the sum of the stop probabilities for each sub-region 102 within each parent region 100 is one hundred percent. Therefore, it is certain that the gaming device will stop the symbol 104 and indicate a sub-region 102 within the upcoming parent region 100, as discussed above. The varying stop probabilities for each sub-region 102 enable the gaming device to be configured so that there is a relatively low likelihood that symbol 104 will stop and indicate a sub-region 102 associated with a relatively high award or value. Likewise, the gaming device can be configured so that there is a relatively high likelihood that symbol 104 will stop and indicate a sub-region 102 associated with a relatively low award or value. Furthermore, the gaming device can be designed so that the expected value associated with each parent region 100 can be the same or substantially the same. As discussed earlier, the expected value is the sum of the products of the stop probabilities and awards associated with each sub-region 102 within a parent region 100.

For example, the expected value calculation for parent region A in FIG. 6 was calculated in the following manner: $[(10\%\times100)+(30\%\times40)+(60\%\times20)=34]$. Preferably, the gaming device does not inform the player of the stop probabilities associated with the sub-regions 102. Instead, the gaming device preferably only informs the player of the various awards associated with sub-regions 102. Furthermore, it is preferable that the gaming device moves symbol 104 at a predetermined rate such that the player is unable to detect that the gaming device enables symbol 104 to move so as to indicate a sub-region within the upcoming parent region 100, where the gaming device determines the sub-region at which the symbol 104 will stop based upon this mathematical calculation.

As illustrated in FIG. 6, the sub-regions 102 can be associated with values which vary greatly in magnitude. For example, in parent region D, its sub-region one is associated with a value of one thousand five hundred and its sub-region three is associated with a value of two. Here, it is expected that the player will attempt to reach sub-region one. However, preferably unbeknownst to the player, the player only has a two percent likelihood of reaching this relatively large value. Furthermore, although values associated with sub-regions may vary greatly, the expected values for each parent region 100 vary only slightly. The expected values for each of the parent regions 100 set forth in FIG. 6 vary by no more than one and six tenths of one percent.

Referring again to FIG. 5, once the gaming device stops the symbol 104 and indicates a particular sub-region 102, the gaming device may or may not provide the player with an award, as indicated by block 120. Whether or not the gaming device provides an award is preferably predetermined by the computer programming of the gaming device. However, this determination can also be made randomly by the computer of the gaming device during the game. In addition, as indicated by diamond 122, a terminating condition may or may not occur at this point. A terminating condition can be any event or sequence of events which occur during the game which cause the game to terminate. Preferably, one terminating condition is the player initiating the stopping of symbol 104 a predetermined number of times. However, the gaming device can include any other terminating condition, and this condition can be predetermined or determined during the game. At this point, if a terminating condition does occur, the game terminates as indicated by block 124. Finally, as indicated by block 126, the gaming device provides the player with any payout due to the player.

The game scheme of the present invention provides a symbol moving along a plurality of sub-regions. A plurality of parent regions each include two or more of these sub-regions. The gaming device provides players with the opportunity to use their skill to cause a symbol to stop moving. Where the symbol stops ultimately determines how great of an award the player gains. It is expected that the player will seek to stop the symbol so that the symbol indicates certain sub-regions which are associated with relatively high awards. However, although the gaming device enables the player to use his or her skill to cause a symbol to stop and indicate a sub-region within a particular parent region (i.e., to pick a parent region), the gaming device does not enable the player to use his or her skill to control which sub-region the symbol will indicate. It is preferable that this inability to skillfully control the ultimate indication of the symbol is undisclosed. This type of game scheme enables players to become involved in skill-based activities in gaming devices while not being able to use their skills to achieve desired payouts.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is hereby claimed as follows:

1. A gaming device operable under control of a processor, the gaming device comprising:

a game controlled by the processor and operable upon a wager by a player;

a continuous course which is divisible into a plurality of parent regions;

a plurality of sub-regions within each one of the parent regions;

a plurality of values, each one of the values being associated with one of the sub-regions, wherein a plurality of said values are different;

a plurality of different stop probabilities associated with the different values;

a plurality of identical or substantially identical expected values, wherein each parent region has one of the expected values and said expected value of said parent region is based, at least in part, on the values and the stop probabilities associated with the sub-regions of said parent region;

at least one display device controlled by the processor and operable to display the sub-regions and to indicate a plurality of the sub-regions; and an input device operable to communicate with the processor, said input device activatable by the player to initiate a stopping of the indication of the plurality of sub-regions, wherein the processor is operable to:

(a) cause the display device to display a plurality of the sub-regions within each one of the parent regions while the parent regions are positioned within the continuous course;

(b) select one, and less than all, of the parent regions after the input device is activated by the player, (c) select one of the sub-regions in said selected parent region, (d) cause the display device to indicate said selected sub-region, and (e) provide the value associated with said selected sub-region to the player.

2. The gaming device of claim 1, which includes a memory device operatively coupled to the processor, the memory device storing at least one instruction which is executable by the processor to: (i) receive an input signal in response to a single activation of the input device; and (ii) automatically perform steps (b), (c), (d) and (e) in response to the single activation.

3. The gaming device of claim 1, wherein the processor is operable to cause the display device to display a sequential indication of the plurality of the sub-regions.

4. The gaming device of claim 1, wherein the processor is operable to cause the display device to display individual indications of the plurality of the sub-regions.

5. The gaming device of claim 1, wherein the display device displays the parent regions.

6. The gaming device of claim 1, wherein each one of the parent regions defines a plurality of non-displayed lines which bound the sub-regions within said parent region.

7. The gaming device of claim 1, wherein the game is a primary game and the parent regions and sub-regions are in a secondary game operable after an occurrence of a triggering event.

8. The gaming device of claim 1, the input device is activatable by the player to initiate a stopping of the indication of the plurality of sub-regions when one of the sub-regions is indicated.

9. The gaming device of claim 1, wherein the selection of one of the sub-regions in said selected parent region is a random selection.

10. The gaming device of claim 1, which includes a plurality of instructions which are executable by the processor to: (a) determine the parent region of the sub-region which is being indicated when the player activates the input device; and (b) then select one of the sub-regions within another one of the parent regions.

11. The gaming device of claim 10, wherein the determined parent region and the parent region of the selected sub-region are adjacent to one another.

12. The gaming device of claim 10, wherein the expected value for each parent region is a sum of products of the respective value and stop probability for each sub-region of said parent region.

13. A gaming device controlled by a processor, the gaming device comprising:

a game controlled by the processor and operable upon a wager;

a continuous course which is divisible into a plurality of groups, wherein each one of the groups includes a plurality of regions;

a plurality of different values, each one of the values being associated with one of the regions;

a plurality of different stop probabilities, each one of the stop probabilities being associated with one of the regions so that each one of groups has:

(a) a first one of the regions associated with both: (i) a first one of the values, and (ii) a first one of the stop probabilities;

(b) a second one of the regions associated with both: (i) a second one of the values, and (ii) a second one of the stop probabilities, the first value being lower than the second value, the first stop probability being higher than the second stop probability;

a plurality of expected values, each group having one of said expected values, the expected values being identical or substantially identical to one another, for each group said expected value based, at least in part, on the values and the stop probabilities associated with the regions of said group;

at least one display device controlled by the processor and operable to display the values and the regions, and to indicate a plurality of the regions; and an input device operable to communicate with the processor, said input device activatable by the player to initiate a stopping of the indication of the plurality of regions, wherein the processor is operable to:

(a) cause the display device to display a plurality of the regions within each one of the groups while the groups are positioned within the continuous course;

(b) cause an indication of at least one of the regions of a first one, and less than all, of the groups such that the player can activate the input when one of the regions in the first one of the groups is indicated, (c) cause the display device to display an indication of one of the regions in a second one, and less than all, of the groups, wherein:

(i) the second group is determined, at least in part, based on when the input device is activated, and (ii) said indicated region in said second group is randomly determined, and (d) cause an indication of the value associated with said indicated region.

14. The gaming device of claim 13, wherein the processor is operable to cause the display device to display a sequential indication of the plurality of the regions.

15. The gaming device of claim 13, wherein the processor is operable to cause the display device to display individual indications of the plurality of the regions.

16. The gaming device of claim 13, which includes a memory device operatively coupled to the processor, the memory device storing at least one instruction which is executable by the processor to: (i) receive an input signal in response to a single activation of the input device; and (ii) automatically perform steps (c) and (d) in response to the single activation.

17. The gaming device of claim 13, wherein the first group and the second group are positioned adjacent to one another.

18. The gaming device of claim 13, wherein each one of the groups defines a plurality of non-displayed lines which bound the regions within said group.

19. The gaming device of claim 17, wherein the expected value for each group is a sum of products of the value and the probability for each region of said group.

20. A gaming device operable under control of a processor, the gaming device comprising:

a game controlled by the processor and operable upon a wager by a player;

a continuous course which is divisible into a plurality of parent regions;

a plurality of sub-regions within each one of the parent regions;

a plurality of different awards, each one of the awards associated with one of the sub-regions;

a plurality of different stop probabilities, each one of the stop probabilities associated with one of the sub-regions;

a plurality of expected values, each one of the expected values being based on one of the stop probabilities applied to one of the awards, the expected values being identical or substantially identical to one another, each one of the sub-regions being associated with one of the expected values;

a display device controlled by the processor and operable to display:

(a) each of the sub-regions in each of the parent regions; and (b) a plurality of indications of the sub-regions; and a player input device in communication with the processor and activatable by the player;

wherein the processor is programmed to:

(a) cause the display device to display a plurality of the sub-regions within each one of the parent regions while the parent regions are positioned within the continuous course:

(b) select one, and less than all, of the parent regions based, at least in part, on an activation of the player input device:

(c) select one of the sub-regions in the selected parent: and (d) provide the award associated with said selected sub-region to the player.

21. The gaming device of claim 20, wherein the processor is programmed to randomly select one of the sub-regions in said player selected parent region.

22. The gaming device of claim 20, wherein the processor is programmed to select one of the sub-regions in said player selected parent region based on different weightings associated with said sub-regions.

23. The gaming device of claim 20, wherein each parent region has a plurality of sub-regions.

24. The gaming device of claim 20, wherein the processor is operable to cause the display device to display a sequential indication of the plurality of the sub-regions.

25. The gaming device of claim 20, wherein the processor is operable to cause the display device to display individual indications of the plurality of the sub-regions.

26. The gaming device of claim 20, wherein the game is a primary game and the parent regions and sub-regions are in a secondary game operable after an occurrence of a triggering event.

27. The gaming device of claim 20, wherein the selection of one of the sub-regions in said selected parent region is a random selection.

28. The gaming device of claim 20, wherein each one of the parent regions has: (a) a first one of the sub-regions associated with a first award and a first stop probability; and (b) a second one of the sub-regions associated with a second award and a second stop probability, the first award being lower than the second award, the first stop probability being higher than the second stop probability.

29. The gaming device of claim 28, wherein the selected sub-region is different from the sub-region which is being indicated when the input device is activated by the player.

30. The gaming device of claim 28, wherein the expected value for each parent region is a sum of products of the value and the probability for each sub-region of said parent region.

31. A gaming device operable under control of a processor, the gaming device comprising:

a game controlled by the processor and operable upon a wager by a player;

a continuous course which is divisible into a plurality of parent regions;

a plurality of sub-regions within each one of the parent regions, the plurality of sub-regions including at least a first sub-region and a second sub-region, the first sub-region being associated with a first value and a first stop probability, the second sub-region being associated with a second value and a second stop probability, the first value being lower than the second value, the first stop probability being higher than the second stop probability;

a plurality of expected values, each one of the sub-regions having one of said expected values, the expected values being identical or substantially identical to one another, said expected values based, at least in part, on the first and second values and the first and second stop probabilities associated with the sub-regions;

an input device in communication with the processor;

at least one display device controlled by the processor; and a plurality of instructions, which when executed by the processor, cause the processor to operate with the at least one display device and the input device to:

(a) display a plurality of the sub-regions within each one of the parent regions while the parent regions are positioned within the continuous course;

(b) receive an input signal corresponding to an activation of the input device by the player, the activation occurring at a time when one of the sub-regions in one of the parent regions is being indicated;

(c) based on the time of the activation, initiates a selection of one, and less than all, of the plurality of parent regions; and (d) select one of the sub-regions in said selected parent region, said selections being variable depending ,at least in part, on:

the time at which the input device is activated; and a random determination; and (e) provide the value associated with the selected sub-region to the player.

32. The gaming device of claim 31, wherein the display is operable to display the parent regions.

33. The gaming device of claim 31, wherein the game is a primary game and the parent regions and sub-regions are in a secondary game operable after an occurrence of a triggering event.

34. The gaming device of claim 31, wherein the selection of one of the sub-regions in said selected parent region is the random selection.

35. The gaming device of claim 31, wherein the selected sub-region is different from the sub-region which is being indicated when the input device is activated by the player.

36. The gaming device of claim 35, wherein at least one of the parent regions defines a plurality of non-displayed lines which bound the sub-regions within said parent region.

37. The gaming device of claim 35, wherein the expected value for each parent region is a sum of products of the value and the stop probability for each sub-region of said parent region.

* * * * *

UNITED STATES PATENT AND TRADEMARK OFFICE

CERTIFICATE OF CORRECTION

PATENT NO. : 7,473,175 B2 Page 1 of 1
APPLICATION NO. : 11/106992
DATED : January 6, 2009
INVENTOR(S) : Anthony J. Baerlocher It is certified that error appears in the above-identified patent and that said Letters Patent is hereby corrected as shown below:

In Claim 31, Column 14, Line 2, change “variable depending ,at least in” to --variable depending, at least in--.

Signed and Sealed this

Second Day of June, 2009

JOHN DOLL
*Acting Director of the United States Patent and Trademark Office*